(12) United States Patent
Kumar et al.

(10) Patent No.: US 6,597,818 B2
(45) Date of Patent: *Jul. 22, 2003

(54) METHOD AND APPARATUS FOR PERFORMING GEO-SPATIAL REGISTRATION OF IMAGERY

(75) Inventors: Rakesh Kumar, Monmouth Junction, NJ (US); Stephen Charles Hsu, Cranbury, NJ (US); Keith Hanna, Princeton, NJ (US); Supun Samarasekera, Princeton, NJ (US); Richard Patrick Wildes, Princeton, NJ (US); David James Hirvonen, Princeton, NJ (US); Thomas Edward Klinedinst, Doylestown, PA (US); William Brian Lehman, Mount Holly, NJ (US); Bodgan Matei, Piscataway, NJ (US); Wenyi Zhao, Plainsboro, NJ (US); Barbara Levienaise-Obadia, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/803,700

(22) Filed: Mar. 9, 2001

(65) Prior Publication Data

US 2001/0038718 A1 Nov. 8, 2001

Related U.S. Application Data

(63) Continuation-in-part of application No. 09/075,462, filed on May 8, 1998.
(60) Provisional application No. 60/046,075, filed on May 9, 1997, provisional application No. 60/224,258, filed on Aug. 10, 2000, provisional application No. 60/188,270, filed on Mar. 10, 2000, and provisional application No. 60/260,950, filed on Jan. 11, 2001.

(51) Int. Cl.[7] .............................. G06K 9/32; G06F 7/00
(52) U.S. Cl. ...................... 382/294; 382/284; 382/305; 707/102
(58) Field of Search ................................. 382/115, 284, 382/285, 287, 289, 295, 296, 190, 305, 103, 106, 240, 294; 244/3.17; 348/117; 707/102; 701/25, 28, 207, 208, 209, 213; 702/2, 151, 5, 85; 345/121, 126, 435, 436, 437, 438

(56) References Cited

U.S. PATENT DOCUMENTS 3,712,563 A * 1/1973 Alpers ........................ 244/3.17
4,179,824 A   12/1979 Marsh ........................ 35/10.24

(List continued on next page.)

FOREIGN PATENT DOCUMENTS

WO    WO 95 32483    11/1995    ............ G06K/9/20

OTHER PUBLICATIONS

"Registration of Video to Geo–Referenced Imagery", R. Kumar et al., Proceedings of the Int. Conf. on Pattern Recognition, Aug. 1998, vol. 2, pp. 1393–1400.

(List continued on next page.)

Primary Examiner—Bhavesh M. Mehta
Assistant Examiner—Kanji Patel
(74) Attorney, Agent, or Firm—William J. Burke

(57) ABSTRACT

A system and method for accurately mapping between image coordinates and geo-coordinates, called geo-spatial registration. The system utilizes the imagery and terrain information contained in the geo-spatial database to precisely align geodetically calibrated reference imagery with an input image, e.g., dynamically generated video images, and thus achieve a high accuracy identification of locations within the scene. When a sensor, such as a video camera, images a scene contained in the geo-spatial database, the system recalls a reference image pertaining to the imaged scene. This reference image is aligned very accurately with the sensor's images using a parametric transformation. Thereafter, other information that is associated with the reference image can easily be overlaid upon or otherwise associated with the sensor imagery.

27 Claims, 7 Drawing Sheets

U.S. PATENT DOCUMENTS

| | | | | |
|---|---|---|---|---|
| 4,232,313 A | | 11/1980 | Fleishman | 343/6 R |
| 5,124,915 A | | 6/1992 | Krenzel | 364/420 |
| 5,592,573 A | * | 1/1997 | Eisenbarth et al. | 382/294 |
| 5,596,494 A | * | 1/1997 | Kuo | 702/2 |
| 5,633,946 A | | 5/1997 | Lachinski et al. | 382/103 |
| 5,649,032 A | | 7/1997 | Burt et al. | 382/284 |
| 5,657,402 A | | 8/1997 | Bender et al. | 382/284 |
| 5,784,431 A | | 7/1998 | Kalend et al. | 378/65 |
| 5,835,386 A | | 11/1998 | Orr et al. | 364/578 |
| 5,894,323 A | * | 4/1999 | Kain et al. | 348/116 |
| 5,956,427 A | * | 9/1999 | Greenspan et al. | 382/240 |
| 5,963,664 A | | 10/1999 | Kumar et al. | 382/154 |
| 5,968,109 A | | 10/1999 | Israni et al. | 701/208 |
| 6,023,665 A | * | 2/2000 | Millgard | 702/151 |
| 6,084,989 A | | 7/2000 | Eppler | 382/293 |

OTHER PUBLICATIONS

PCT International Search Report, international application No. PCT/US01/07770, date of mailing Mar. 11, 2001.

Hong Jiang Zhang, et al., "Automatic Partitioning of Full–Motion Video", Multimedia Systems (1993), pp. 10–28.

* cited by examiner

| PT. NO. | VIDEO IMAGE | | REFERENCE IMAGE | | REFERENCE IMAGE | |
|---|---|---|---|---|---|---|
| | INPUT POINT | | HAND MEASURED | | COMPUTED | |
| | x pix | y pix | x pix | y pix | x pix | y pix |
| POINTS IN THE CENTER OF THE IMAGE | | | | | | |
| 1 | 153 | 118 | 280 | 380 | 280.26 | 378.24 |
| 2 | 219 | 113 | 341 | 372 | 341.65 | 371.33 |
| 3 | 100 | 119 | 231 | 382 | 229.90 | 381.05 |
| 4 | 174 | 153 | 300 | 414 | 300.84 | 413.47 |
| 5 | 255 | 112 | 376 | 371 | 376.27 | 368.78 |
| 6 | 90 | 167 | 221 | 432 | 220.72 | 432.42 |
| POINTS IN THE EDGE OF THE IMAGE | | | | | | |
| 7 | 274 | 23 | 397 | 269 | 397.06 | 267.75 |
| 8 | 14 | 26 | 125 | 278 | 124.45 | 276.11 |
| 9 | 48 | 222 | 176 | 497 | 175.42 | 498.84 |
| 10 | 336 | 220 | 477 | 493 | 477.88 | 494.06 |
| 11 | 351 | 97 | 483 | 350 | 481.45 | 345.84 |
| 12 | 9 | 120 | 130 | 386 | 132.27 | 385.72 |
| OTHER POINTS IN THE IMAGE | | | | | | |
| 13 | 204 | 206 | 330 | 469 | 331.11 | 468.73 |
| 14 | 297 | 152 | 423 | 411 | 422.74 | 411.30 |
| 15 | 119 | 49 | 246 | 309 | 244.89 | 306.67 |

METHOD AND APPARATUS FOR PERFORMING GEO-SPATIAL REGISTRATION OF IMAGERY

This application is a continuation-in-part of U.S. patent application Ser. No. 09/075,462, filed May 8, 1998, which claimed priority to U.S. Provisional Patent Application No. 60/046,075, filed May 9, 1997. The application claims the benefit of U.S. Provisional Patent Application Ser. Nos. 60/224,258, filed Aug. 10, 2000; 60/188,270 filed Mar. 10, 2000; and 60/260,950, filed Jan. 11, 2001. All of these applications are incorporated herein by reference.

This invention was made with U.S. government support under contract number N00019-97-C-2017 and DMB07-98-C-J023. The U.S. government has certain rights in this invention.

The invention is generally related to image processing systems and, more specifically, to a method and apparatus for performing geo-spatial registration within an image processing system.

BACKGROUND OF THE INVENTION

The ability to locate scenes and/or objects visible in a video/image frame with respect to their corresponding locations and coordinates in a reference coordinate system is important in visually-guided navigation, surveillance and monitoring systems. Aerial video is rapidly emerging as a low cost, widely used source of imagery for mapping, surveillance and monitoring applications. The individual images from an aerial video can be aligned with one another and merged to form an image mosaic that can form a video map or provide the basis for estimating motion of objects within a scene. One technique for forming a mosaic from a plurality of images is disclosed in U.S. Pat. No. 5,649,032, issued Jul. 15,1992, which is hereby incorporated herein by reference.

To form a "video map", a mosaic (or mosaics) of images may be used as a database of reference imagery and associated "geo-coordinates" (e.g., latitude/longitude within a reference coordinate system) are assigned to positions within the imagery. The geo-coordinates (or other image or scene attributes) can be used to recall a mosaic or portion of a mosaic from the database and display the recalled imagery to a user. Such a searchable image database, e.g., a video map, is disclosed in U.S. patent application Ser. No. 08/970,889, filed Nov. 14, 1997, and hereby incorporated herein by reference.

A system that images a scene that has been previously stored in the reference database and recalls the reference information in response to the current images to provide a user with information concerning the scene would have applicability in many applications. For example, a camera on a moving platform imaging a previously imaged scene contained in a database may access the database using the coordinates of the platform. The system provides scene information to a user. However, a key technical problem of locating objects and scenes in a reference mosaic with respect to their geo-coordinates seen from the camera platform's current location. Current systems for geo-location, the mapping of camera coordinates to the geo-coordinates, use position and attitude information for a moving camera platform within some fixed world coordinates to locate the video frames in the reference mosaic database. However, the accuracy achieved is only on the order of tens to hundreds of pixels. This inaccuracy is not acceptable for high resolution mapping.

Therefore, there is a need in the art for a method and apparatus that identifies a location within an imaged scene with a sub-pixel accuracy directly from the imagery within the scene itself. There is also a need to extend current geo-registration systems to handle other types of video, e.g., (1) zoomed in video where any one video frame may not have enough information for accurate geo-registration, (2) highly oblique video and video that is drastically different in photometric appearance compared to a reference image.

SUMMARY OF THE INVENTION

The present invention provides a system and method for accurately mapping between camera coordinates and geo-coordinates, called geo-spatial registration. The present invention utilizes the imagery and terrain information contained in the geo-spatial database to precisely align the reference imagery with input imagery, such as dynamically generated video images or video mosaics, and thus achieve a high accuracy identification of locations within the scene. The geo-spatial reference database generally contains a substantial amount of reference imagery as well as scene annotation information and object identification information. When a sensor, such as a video camera, images a scene contained in the geo-spatial database, the system recalls a reference image pertaining to the imaged scene. This reference image is aligned very accurately with the sensor's images using a parametric transformation. Thereafter, other information (annotation, sound, and the like) that is associated with the reference image can easily be overlaid upon or otherwise associated with the sensor imagery. Applications of geo-spatial registration include text/graphical/audio annotations of objects of interest in the current video using the stored annotations in the reference database to augment and add meaning to the current video. These applications extend beyond the use of aerial videos into the challenging domain of video/image-based map and database indexing of arbitrary locales, like cities and urban areas.

Alternative embodiments of the invention utilize one or more of the following techniques in performing geo-registration include iterative image alignment bundle estimation processes, multiframe processing, orientation filtering, outlier rejection, local-to-global image alignment, three-dimensional reference image rendering, and iterative image processing. Such processing enables geo-registration of oblique video imagery and to minimize occlusion effects in the geo-registered imagery. Another alternative embodiment utilizes continuous image processing to yield a continuous stream of geo-registered imagery.

BRIEF DESCRIPTION OF THE DRAWINGS

The teachings of the present invention can be readily understood by considering the following detailed description in conjunction with the accompanying drawings, in which:

FIG. 5 is a table comparing actual and computed locations in an image;

To facilitate understanding, identical reference numerals have been used, where possible, to designate identical elements that are common to the figures.

DETAILED DESCRIPTION

The present invention is a system and method for performing geo-registration of one or more video frames with one or more reference images. The system renders a reference image having a viewpoint that matches the viewpoint of the sensor that produced the video frames. The system then aligns the video frame or frames with the rendered reference image. The system uses one or more of the following techniques to enhance the performance of the geo-registration process:

- The reference imagery may be rendered as a three-dimensional image or images to include parallax information in the rendered imagery.
- Simultaneously align multiple video frames with the reference imagery to improve the robustness of the image matching process.
- Use oriented filtering of the images by enhancing image features to improve the quality of the low-level matching between the images.
- Perform outlier rejection to eliminate incorrect feature matches.
- Use local-to-global processing to align a plurality of video frames to one another and then align a plurality of the video images to a reference imagery.
- Update the engineering support data using alignment parameters.

As shall be discussed below, various combinations of one or more of these techniques can be used to create various embodiments of the present invention.

Figure 1:
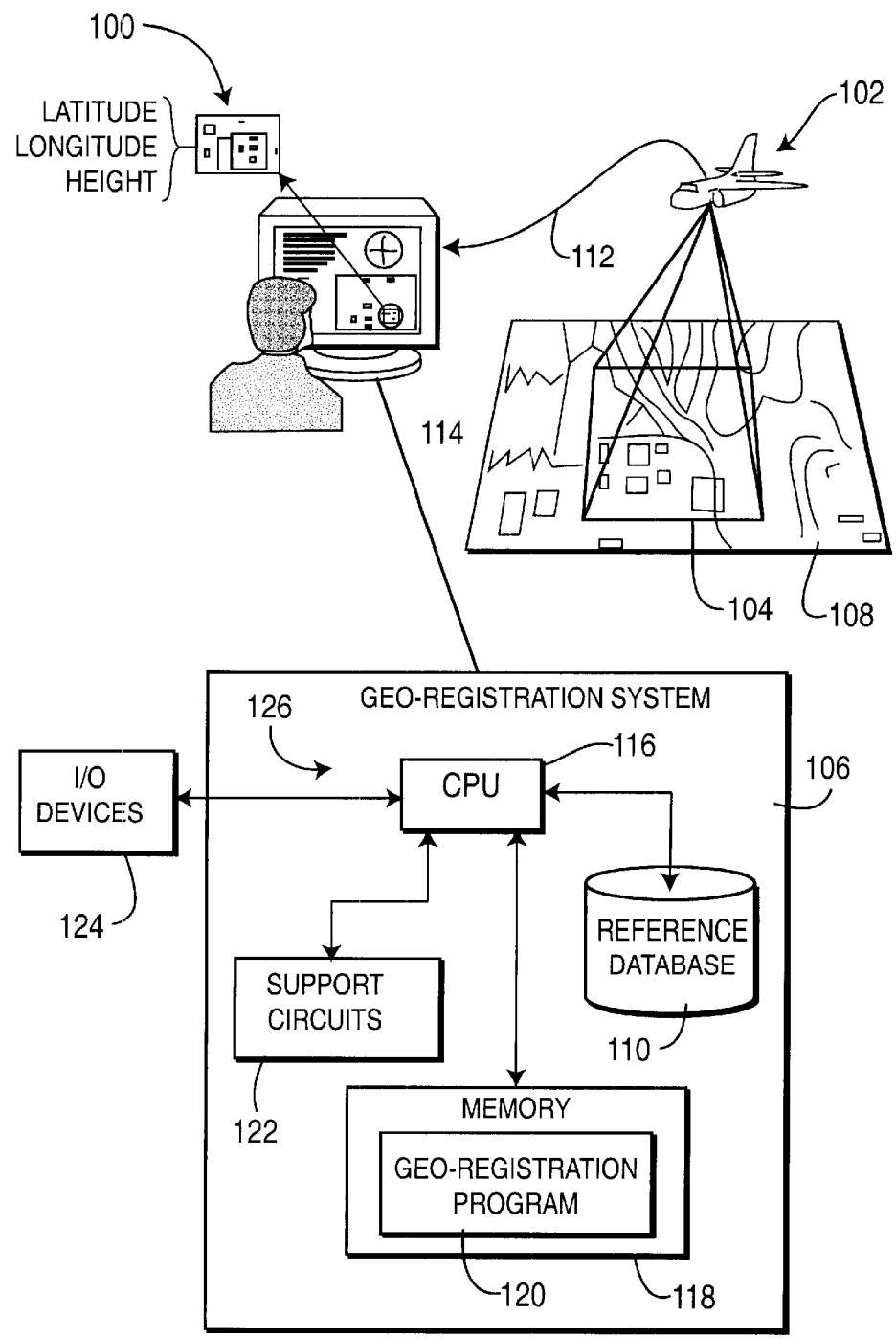
FIG. 1 depicts a conceptual view of a system incorporating one embodiment of the present invention.

FIG. 1 depicts a conceptual view of a comprehensive system 100 containing a geo-registration system 106 of the present invention. The figure shows a mobile platform 102 dynamically capturing "current" video images of a scene at a specific locale 104 within a large area 108. The system 106 identifies information in a reference database 110 that pertains to the current video images being transmitted along path 112 to the system 106. The system 106 "geo-registers" the current video images to the reference information or imagery stored within the reference database 110, i.e., the current video is aligned with geodetically calibrated reference imagery and information. After "geo-registration", the footprints of the current video are shown on a display 114 to a user overlaid upon the reference imagery or other reference annotations. As such, reference information such as latitude/longitude/elevation of points of interest is retrieved from the database and is overlaid on the relevant points on the current video. Consequently, the user is provided with a comprehensive understanding of the scene that is being imaged.

The system 106 is generally implemented by executing one or more programs on a general purpose computer 126. The computer 126 contains a central processing unit (CPU) 116, a memory device 118, a variety of support circuits 122 and input/output devices 124. The CPU 116 can be any type of high speed processor such as a PENTIUM II manufactured by Intel Corporation or a POWER PC manufactured by Motorola Inc. The support circuits 122 for the CPU 116 include conventional cache, power supplies, clock circuits, data registers, I/O interfaces and the like. The I/O devices 124 generally include a conventional keyboard, mouse, and printer. The memory device 118 can be random access memory (RAM), read-only memory (ROM), hard disk storage, floppy disk storage, compact disk storage, DVD storage or any combination of these devices. The memory device 118 stores the program or programs (e.g., geo-registration program 120) that are executed to implement the geo-registration technique of the present invention. When the general purpose computer executes such a program, it becomes a special purpose computer, i.e., the computer becomes an integral portion of the geo-registration system 106. Although the invention has been disclosed as being implemented as an executable software program, those skilled in the art will understand that the invention may be implemented in hardware, software or a combination of both. Such implementations may include a number of processors independently executing various programs and dedicated hardware such as application specific integrated circuits (ASICs).

Figure 2:
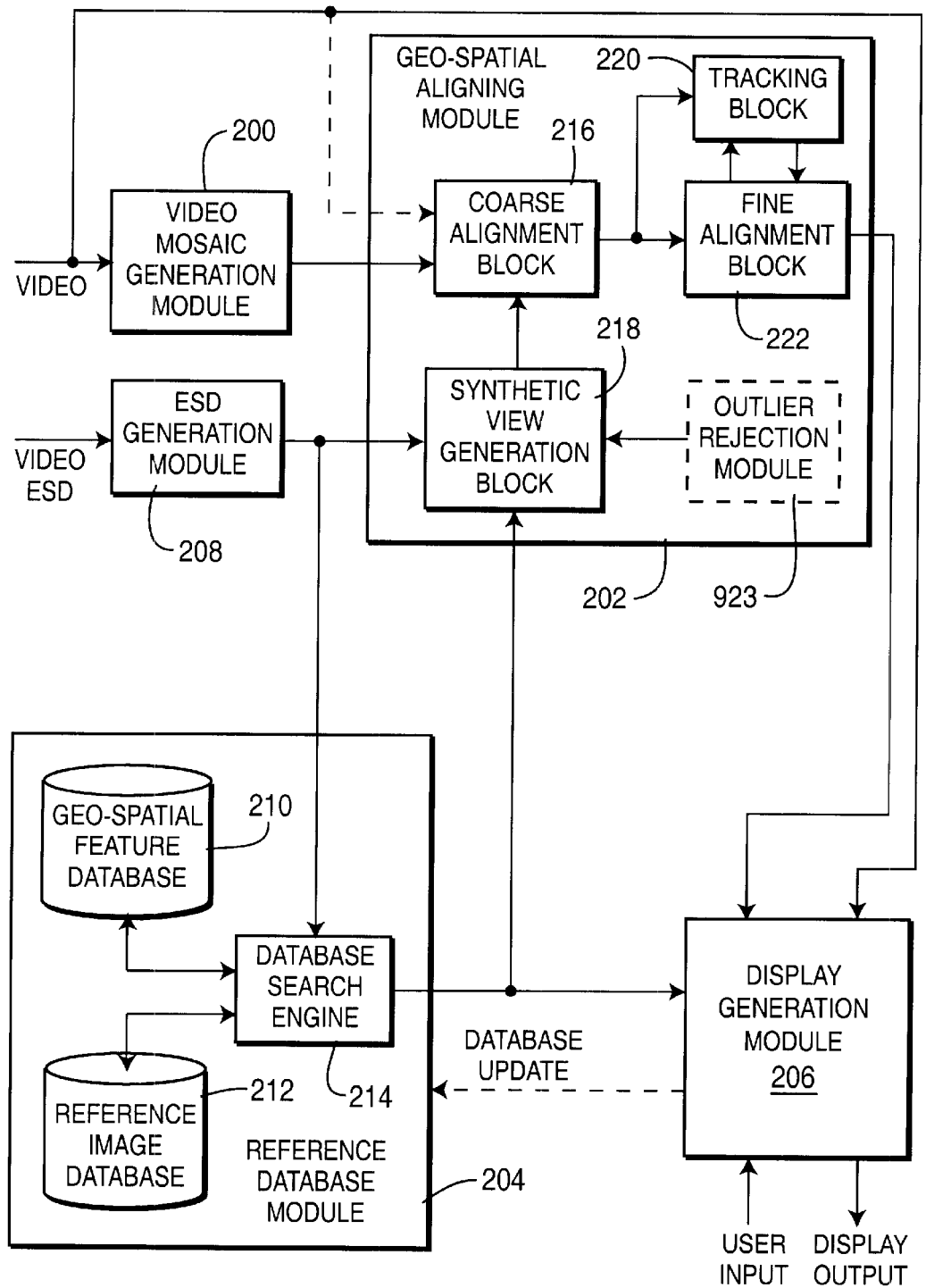
FIG. 2 depicts a functional block diagram of the geo-registration system of one embodiment of the present invention.

FIG. 2 depicts a functional block diagram of the geo-registration system 106 of the present invention. Illustratively, the system 106 is depicted as processing a video signal as an input image; however, from the following description those skilled in the art will realize that the input image (referred to herein as input imagery) can be any form or image including a sequence of video frames, a sequence of still images, a still image, a mosaic of images, a portion of an image mosaic, and the like. In short, any form of imagery can be used as an input signal to the system of the present invention.

The system 106 comprises a video mosaic generation module 200 (optional), a geo-spatial aligning module 202, a reference database module 204, and a display generation module 206. Although the video mosaic generation module 200 provides certain processing benefits that shall be described below, it is an optional module such that the input imagery may be applied directly to the geo-spatial aligning module 202. When used, the video mosaic generation module 200 processes the input imagery by aligning the respective images of the video sequence with one another to form a video mosaic. The aligned images are merged into a mosaic. A system for automatically producing a mosaic from a video sequence is disclosed in U.S. Pat. No. 5,649,032, issued Jul. 15, 1997, and incorporated herein by reference. Alternatively, the mosaic does not need to be fully formed (i.e., "stitched"), but rather the mosaic can be described by the frame-to-frame alignment parameters (such as frame-to-frame motion) and portions of the frames.

The reference database module 204 provides geodetically calibrated reference imagery and information that is relevant to the input imagery. The camera platform (102 in FIG. 1) provides certain field of view, position and attitude information that is processed by the engineering support data (ESD) module 208 to provide indexing information that is used to recall reference images (or portions of reference images) from the reference database module 204. A portion of the reference image that is nearest the video view (i.e., has a similar point-of-view of a scene) is recalled from the database and is coupled to the geo-spatial aligning module 202. The module 202 first renders the reference image to form a synthetic image having a point-of-view that is similar to the current video view, then the module 202 accurately aligns the reference information with the video image or mosaic. Alternatively, the video images or mosaic can be aligned to the reference information. The alignment process is accomplished in an iterative manner as described in detail below. The transformation parameters that align the video and reference images are provided to the display module 206. Using these transformation parameters, the original video can be accurately overlaid on the reference information, or vice versa, to produce a comprehensive view of the scene.

To obtain input imagery that can be indexed and aligned with respect to geodetically calibrated reference imagery and information, as mentioned above, a "video mosaic" representing an imaged scene is produced to remove redundant information in the video image sequence. Video frames are typically acquired at 30 frames per second and contain a substantial amount of frame-to-frame overlap. For typical altitudes and speeds of airborne platforms, the overlap between adjacent frames may range from 4/5 to 49/50th of a single frame. Therefore, conversion of video frames into video mosaics is an efficient way to handle the amount of information contained in the incoming video stream. The invention exploits the redundancy in video frames by aligning successive video frames using low order parametric transformations such as translation, affine and projective transformations. The frame-to-frame alignment parameters enable the creation of a single extended view mosaic image that authentically represents all the information contained in the aligned input frames. For instance, typically 30 frames of standard NTSC resolution (720×480) containing about ten million pixels may be reduced to a single mosaic image containing only about two-hundred thousand to two million pixels depending on the overlap between successive frames. The video mosaic is subsequently used for geo-referencing and location. Alternatively, the mosaic can be represented as a set of key video frames and the frame-to-frame alignment parameters.

Although many alignment algorithms are available that achieve image alignment of video imagery, the present invention uses a projective transformation to align the images. Additionally, the mosaicing process is extended to handle unknown lens distortion present in the imagery. Exemplary alignment processing for images (video images, in particular) is disclosed in U.S. Pat. No. 5,649,032. The result is a video mosaic representing the information contained in the sequence of video frames with any redundant information removed from the mosaic.

Often in aerial video streams, the lens distortion parameters must be explicitly modeled in the estimation process. A fundamental assumption made in the earlier work on mosaicing was that one image could be chosen as the reference image and the mosaic would be constructed by merging all other images to this reference image. The video mosaic generation module 200 extends the direct estimation algorithms of the prior art to use a reference coordinate system but not a reference image. The module 200 computes the motion parameters that warp all images to a virtual image mosaic in this reference coordinate system. Each pixel in this virtual image mosaic is predicted by intensities from more than one image. An error measure is minimized over the virtual image to compensate for lens distortion. The error measure may be the sum of the variances or the sum of the predicted pixel intensities at each pixel location. U.S. patent application Ser. No. 08/966,776, filed Nov. 10, 1997 and incorporated herein by reference, discloses the details of a lens distortion compensation procedure.

In order to compute the correspondences of the video frames and the unknown parameters simultaneously, the invention uses an error function that minimizes the variance in intensities of a set of corresponding points in the images, that map to the same ideal reference coordinate. Formally, the unknown projective transformation parameters for each frame, $A^1 \ldots A^N$, and the lens distortion parameter, $\gamma_1$ are solved using Equation 1.

$$\min_{A^1 \ldots A^N, \gamma_1} \sum_p \frac{1}{M(p)} \sum_i (I_i(p^i) - \bar{I}(p))^2 \qquad (1)$$

where point $p^i$ in frame i is a transformation of a point p in the reference coordinate system, $\bar{I}(p)$ is the mean intensity value of all the $p^i$'s that map to p, and $M(p)$ is a count of all such $p^i$'s. Therefore, given a point p in the reference coordinates, each term in the summation over i in Equation 1 is the variance of all the intensity values at points $p^i$ that map to point p.

In geo-spatial registration scenarios, the look angles of the imaging platform with respect to the Earth may be known with varying degrees of precision. The knowledge of these angles and other engineering support data (ESD) can be used to correct for oblique look angles in order to generate a nadir view, i.e., use a process for ortho-correction. After performing ortho-correction, video mosaics may be created as described above. Ortho-corrected mosaics have the advantage that the view in an orthographic coordinate system is similar to that available in orthographic photographs.

Depending on the imaging scenario, ortho-corrected video mosaicing may have to account for the effects of parallax. The processing involved has to use the three-dimensional parallax present in the scene along with the warping transformation that accounts for the oblique angles of the camera platform. To account for parallax, the invention can use one of two approaches: (1) warp the imagery using any pre-existing Digital Elevation Map (DEM) information contained in the database or (2) account for parallax by computing the parallax using multiple images of the scene. Parallax computation from multiple video images and its use in the creation of parallax-corrected mosaics is disclosed in commonly assigned U.S. patent application Ser. No. 08/493,632, filed Jun. 22, 1995 and incorporated herein by reference.

In addition to image information, the sensor platform (102 in FIG. 1) also provides engineering support data (ESD), e.g., global positioning system (GPS) information, inertial navigation system (INS), image scale, attitude, rotation, and the like, that is extracted from the signal received from the platform and provided to the geo-spatial aligning module 202 as well as the database module 204. Specifically, the ESD information is generated by the ESD generation module 208. The ESD is used as an initial scene identifier and sensor point-of-view indicator. As such, the ESD is coupled to the reference database module 204 and used to recall database information that is relevant to the current sensor video imagery. Moreover, the ESD can be used to maintain coarse alignment between subsequent video frames over regions of the scene where there is little or no image texture that can be used to accurately align the mosaic with the reference image.

More specifically, the ESD that is supplied from the sensor platform along with the video is generally encoded and requires decoding to produce useful information for the geo-spatial aligning module 202 and the reference database module 204. Using the ESD generation module 208, the ESD is extracted or otherwise decoded from the signal produced by the camera platform to define a camera model (position and attitude) with respect to the reference database. Of course, this does not mean that the camera platform and system can not be collocated, i.e., as in a hand held system with a built in sensor, but means merely that the position and attitude information of the current view of the camera is necessary.

Given that ESD, on its own, can not be reliably utilized to associate objects seen in videos (i.e., sensor imagery) to their corresponding geo-locations, the present invention utilizes the precision in localization afforded by the alignment of the rich visual attributes typically available in video imagery to achieve exceptional alignment rather than use ESD alone. For aerial surveillance scenarios, often a reference image database in geo-coordinates along with the associated DEM maps and annotations is readily available. Using the camera model, reference imagery is recalled from the reference image database. Specifically, given the camera's general position and attitude, the database interface recalls imagery (one or more reference images or portions of reference images) from the reference database that pertains to that particular view of the scene. Since the reference images generally are not taken from the exact same perspective as the current camera perspective, the camera model is used to apply a perspective transformation (i.e., the reference images are warped) to create a set of synthetic reference images from the perspective of the camera.

The reference database module 204 contains a geo-spatial feature database 210, a reference image database 212, and a database search engine 214. The geo-spatial feature database 210 generally contains feature and annotation information regarding various features of the images within the image database 212. The image database 212 contains images (which may include mosaics) of a scene. The two databases are coupled to one another through the database search engine 214 such that features contained in the images of the image database 212 have corresponding annotations in the feature database 210. Since the relationship between the annotation/feature information and the reference images is known, the annotation/feature information can be aligned with the video images using the same parametric transformation that is derived to align the reference images to the video mosaic.

The database search engine 214 uses the ESD to select a reference image or a portion of a reference image in the reference image database 204 that most closely approximates the scene contained in the video. If multiple reference images of that scene are contained in the reference image database 212, the engine 214 will select the reference image having a viewpoint that most closely approximates the viewpoint of the camera producing the current video. The selected reference image is coupled to the geo-spatial aligning module 202.

The geo-spatial aligning module 202 contains a coarse alignment block 216, a synthetic view generation block 218, a tracking block 220 and a fine alignment block 222. Additional alignment blocks can be used to perform intermediate levels of alignment, i.e., medium alignment block (s). The synthetic view generation block 218 uses the ESD to warp a reference image to approximate the viewpoint of the camera generating the current video that forms the video mosaic. These synthetic images form an initial hypothesis for the geo-location of interest that is depicted in the current video data. The initial hypothesis is typically a section of the reference imagery warped and transformed so that it approximates the visual appearance of the relevant locale from the viewpoint specified by the ESD.

The alignment process for aligning the synthetic view of the reference image with the input imagery (e.g., the video mosaic produced by the video mosaic generation module 200, the video frames themselves that are alternatively coupled from the input to the geo-spatial aligning module 202 or some other source of input imagery) is accomplished using one or more steps. In one illustrative embodiment of the invention, two steps are used. A first step, performed in the coarse alignment block 216, coarsely indexes the video mosaic and the synthetic reference image to an accuracy of a few pixels. A second step, performed by the fine alignment block 222, accomplishes fine alignment to accurately register the synthetic reference image and video mosaic with a sub-pixel alignment accuracy without performing any camera calibration. The fine alignment block 222 achieves a sub-pixel alignment between the images. The output of the geo-spatial alignment module 202 is a parametric transformation that defines the relative positions of the reference information and the video mosaic. This parametric transformation is then used to align the reference information with the video such that the annotation/features information from the feature database 210 are overlaid upon the video or the video can be overlaid upon the reference images or both. In essence, accurate localization of the camera position with respect to the geo-spatial coordinate system is accomplished using the video content.

Finally, the ESD updating block 220, an optional process, may be used to update the current estimate of sensor attitude and position based upon results of matching the sensor image to the reference information. As such, the sensor model is updated to accurately position the sensor in the coordinate system of the reference information. This updated information is used to generate new reference images to support matching based upon new estimates of sensor position and attitude and the whole process is iterated to achieve exceptional alignment accuracy. Consequently, once initial alignment is achieved and tracking commenced, the geo-spatial alignment module may not be used to compute the parametric transform for every new frame of video information. For example, fully computing the parametric transform may only be required every thirty frames (i.e., once per second). Once tracking is achieved, the coarse alignment block 216 and/or the fine alignment block 222 could be bypassed for a number of video frames. The alignment parameters can generally be estimated using frame-to-frame motion such that the alignment parameters need only be computed infrequently.

Figure 3:
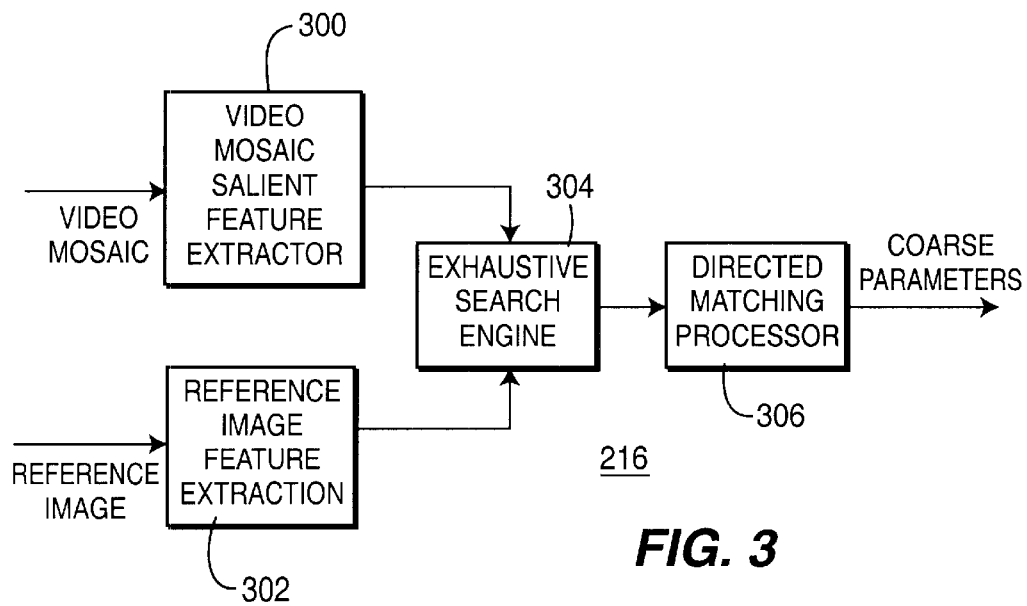
FIG. 3 depicts a functional block diagram of the coarse alignment block of the system in FIG. 2.

FIG. 3 depicts a functional block diagram of the coarse alignment block 216 which contains a video mosaic salient feature extractor 300, a reference image salient feature extractor 302, an exhaustive search engine 304, and a directed matching processor 306. The coarse indexing process locates a video mosaic within a reference image using visual appearance features. In principle, one could exhaustively correlate the intensities in the video mosaic and the reference image at each pixel and find the best match. However, due to the uncertainties in viewpoint defined by ESD and due to real changes in appearance between the reference imagery and the current video, it may not be possible to directly correlate intensities in the two images. The real changes in appearance may be due to change of reflectance of objects and surfaces in the scene (e.g., summer to fall, shadows and the like) and due to difference in illumination between the reference and the video imagery. Changes in appearance due to viewpoint are accounted for to a large extent by the process of warping the reference image to the ESD defined viewpoint. However, for robust matching and localization, indexing and matching must be resilient to uncertainties in ESD and to real changes in the imagery.

The coarse alignment block 216 computes features at multiple scales and multiple orientations that are invariant or quasi-invariant to changes in viewpoint, illumination or sign of the edges. To facilitate such multiple scale computation, the reference images may be stored as image pyramids or image pyramids may be computed when the reference image is recalled from the database. In any event, the reference image scale and resolution should be comparable to that of the video mosaic. To achieve flexibility, the salient feature extractors 300 and 302 may both contains image pyramid generators such that both the video mosaic and the reference image are decomposed into image pyramids to facilitate rapid and accurate salient feature extraction.

Whether operating upon a full video mosaic and reference image or a level of a pyramid from the two images, the salient feature extractors 300 and 302 compute many salient locations both in the reference and video imagery. Such salient feature detection and processing is disclosed in T. Lindeberg, "Detecting Salient Blob-like Image Structures and Their Scales with a Scale-space Primal Sketch: A Method for Focus-of-attention," International Journal of Computer Vision, 1994. The salient feature locations are determined automatically based on distinctiveness of local image structure, i.e., the salient features may be low frequency blobs, high frequency corners or edges, or some combination of these features. The features that are considered salient depend on the scale and resolution of the imagery being processed. Even with the feature representations at salient locations only, there may be too much data for exhaustive matching of the salient features. Therefore, in the exhaustive search engine 304, fast indexing of the multi-dimensional visual features is used to eliminate most of the false matches, i.e., the salient features are pruned. Subsequently, the directed matching processor 306 performs directed matching of the small set of remaining candidate matches which leads to the correct coarse location of the video imagery in the reference coordinate system. In one embodiment of the invention, the directed matching may be performed using a "data tree" process that is disclosed in U.S. Pat. No. 5,159,647, issued Oct. 27, 1992, and incorporated herein by reference. Many other forms of directed matching are known to those skilled in the art and may be used as part of the present invention. The output of the coarse alignment block 216 is a set of coarse parameters for a parametric transform that aligns the reference image to the video mosaic.

Returning to FIG. 2, the coarse localization process of block 216 is used to initialize the process of fine alignment while accounting for the geometric and photometric transformations between the video and reference imagery. In general, the transformation between two views of a scene can be modeled by (i) an external coordinate transformation that specifies the 3D alignment parameters between the reference and the camera coordinate systems, and (ii) an internal camera coordinate system to image transformation that typically involves a linear (affine) transformation and non-linear lens distortion parameters. The fine alignment block 222 combines the external coordinate transformation and the linear internal transformation into a single 3D projective view transformation. This, along with the depth image and the non-linear distortion parameters, completely specifies the alignment transformation between the video pixels and those in the reference imagery. It is to be emphasized that one main advantage of the invention is that no explicit camera calibration parameters need be specified. This aspect tremendously increases the scope of applicability of a system incorporating the present invention to fairly arbitrary video camera platforms. However, if the camera parameters are known, the system may use these parameters to aid the alignment process. The modeled video-to-reference (or reference-to-video) transformation is applied to the solution of the precise alignment problem. The process involves simultaneous estimation of the unknown transformation parameters as well as the warped reference imagery that precisely aligns with the video imagery. Multi-resolution coarse-to-fine estimation and warping with Gaussian/Laplacian pyramids is employed.

More specifically, the following detailed description presents the equations used for aligning video imagery to a co-registered reference image and depth image (The equations for aligning video imagery to a co-registered orthophoto and DEM are similar). The formulation used is the plane+parallax model discussed in commonly assigned U.S. patent application Ser. No. 08/493,632, filed Jun. 22, 1995, and herein incorporated by reference.

The coordinates of a point in a video image are denoted by (x,y). The coordinates of the corresponding point in the reference image are given by $(X_r, Y_r)$. Each point in the reference image has a parallax value k. The parallax value is computed from the dense depth image which is co-registered with the reference image.

There are fifteen parameters $a_1 \ldots a_{15}$ used to specify the alignment, these parameters include:

parameters $a_1 \ldots a_9$ specify the motion of a virtual plane;

parameters $a_{10} \ldots a_{12}$ specify the 3D parallax motion;

parameter $a_{13}$ specifies the lens distortion; and parameters $a_{14} \ldots a_{15}$ specify the center for lens distortion.

First the reference image coordinates $(X_r, Y_r)$ are projected to ideal video coordinates $(X_I, Y_I)$ by using equation 2:

$$X_I = \frac{(a_1 * X_r + a_2 * Y_r + a_3 + k * a_{10})}{(a_7 * X_r + a_8 * Y_r + a_9 + k * a_{12})} \tag{2}$$

$$Y_I = \frac{(a_4 * X_r + a_5 * Y_r + a_6 + k * a_{11})}{(a_7 * X_r + a_8 * Y_r + a_9 + k * a_{12})}$$

Note, since, the right hand side in the above two equations is a ratio of two expressions, the parameters $a_1 \ldots a_{12}$ can only be determined up to a scale factor. We typically make parameter $a_9=1$ and solve for the remaining 11 parameters. The ideal video coordinates $(X_I, Y_I)$ are related to the measured video coordinates (x,y) by equations 3 and 4:

$$x = X_I + a_{13} * (X_I - a_{14}) * r^2 \tag{3}$$

$$y = Y_I + a_{13} * (Y_I - a_{15}) * r^2$$

where:

$$r^2 = (X_r - a_{14})^2 + (Y_r - a_{15})^2 \tag{4}$$

The lens distortion parameters $a_{13} \ldots a_{15}$ may be computed at the video mosaicing stage. In that case, the estimated values are used. Alternatively, the lens distortion parameters can be simultaneously computed with the projective $a_1 \ldots a_8$ and epipolar parameters $a_{10} \ldots a_{12}$. These parameters can be computed or estimated "off-line" or predetermined and recalled from a look-up table. The parallax value {In the case of the reference image being an orthophoto with a corresponding DEM, k is equal to the DEM value} k, at any reference, location is calculated from the depth z at that location using equation 5, $$k = \frac{(z - \bar{z}) * \bar{z}}{\bar{z} * \sigma_z} \quad (5)$$

where $\bar{z}$ and $\sigma_z$ are the average and standard deviation of the depth image values.

The reference imagery and the video are typically acquired at different times. Hence, to correlate the video to the reference imagery, the fine alignment block may optionally perform the following transformations to enhance the alignment accuracy. The fine alignment block 222 first computes and matches the histograms of the video mosaic to the predicted portion of the reference image. This allows the system to modify the video mosaic, so that it has a similar histogram as the reference image. Finally, the invention computes the Laplacian pyramids of the reference image and the modified video mosaic. As discussed below, the alignment parameters are then computed by correlating these two images.

To accurately register the video image to the reference image, the fine alignment block 222 uses a hierarchical direct registration technique. This technique first constructs filter pyramids from each of the two input images, and then estimates the motion parameters in a coarse-fine manner. Within each level the Sum of Squared Difference (SSD) measure integrated over user selected regions of interest is used as a match measure. This measure is minimized with respect to the unknown transformation parameters $a_1 \ldots a_{15}$. The SSD error measure for estimating the transformation parameters within a region is given by equation 6:

$$E(\{A\}) = \sum_x (R(x) - I(Ax))^2 \quad (6)$$

where x=(x,y) denotes the spatial image position of a point, I the (Laplacian pyramid) image intensity and (Ax) denotes the image transformation at that point (see equations 3 and 4). The error is computed over all the points within the region. The optimization is done in an iterative manner, at each level of the pyramid using the Levenberg Marquardt optimization technique. This algorithm is referred to as the "projective pose" algorithm. Other optimization techniques (e.g., Gauss-Newton) are well known to those skilled in the art that can be utilized in the present invention.

If the Digital Elevation Map (DEM) information is not known a priori, then its values are also treated as unknowns in the procedure for optimizing the error function given in equation (6). The optimization is accomplished using the coarse to fine strategy over the levels of the pyramid. At each level of the pyramid, the Levenberg Marquardt optimization technique is used. This is based on the 3D parallax computation algorithm described in commonly assigned U.S. patent application Ser. No. 08/493,632. The alignment algorithm used in this case can be referred to as the "plane+parallax" technique. Other parallax recovery techniques are well known to those skilled in the art and can be used in the present invention.

Note, for video imagery where the terrain imaged is relatively flat with respect to the height of the video sensor, parallax effects will be minimal. In this case, the video imagery may be aligned to the reference imagery using just a "projective" transformation and there is no need to compute any 3D parallax. The pyramid based algorithm used in this case is referred to as the "projective" algorithm.

Figure 4:
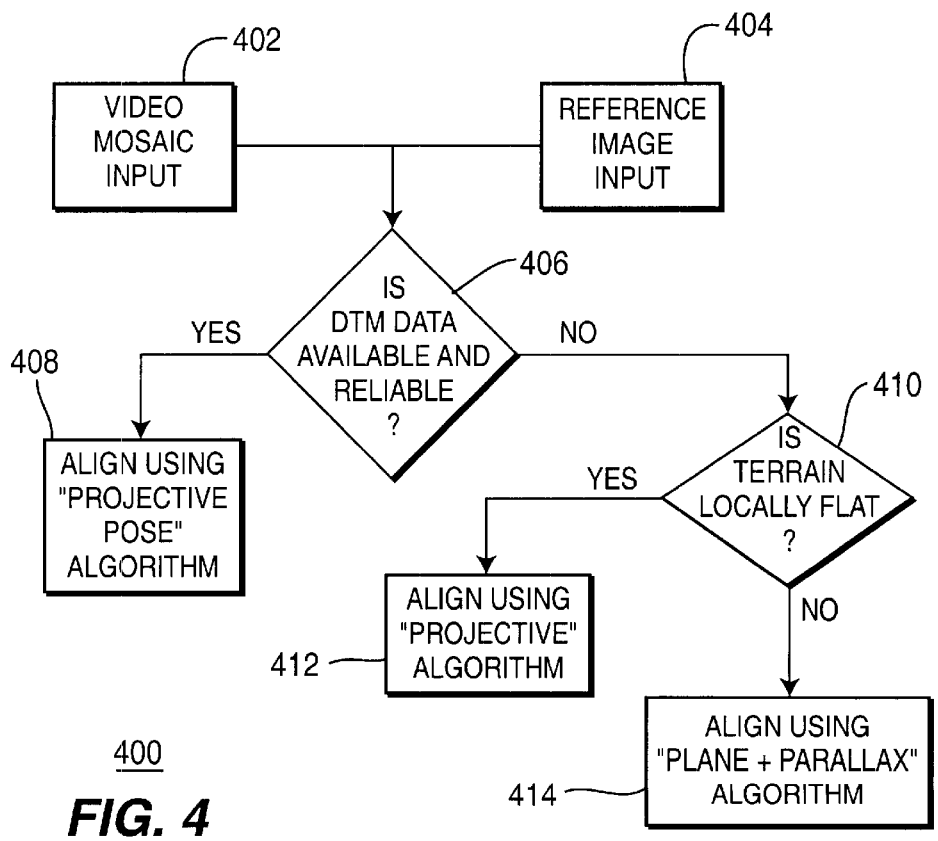
FIG. 4 depicts a flow diagram of the fine alignment block of FIG. 2.

FIG. 4 depicts a process 400 by which the geo-registration program can select the alignment technique that best suits the image content. The video mosaic is input at step 402 and the reference image is input at step 404. The process queries, at step 406, whether the DTM data is available and reliable. If the query is affirmatively answered, the process proceeds to step 408 where the "projective pose" algorithm is used to accurately align the video mosaic and the reference image. On the other hand, if the query at step 406 is negatively answered, the process proceeds to step 410. At step 410, the process queries whether the terrain is locally flat. If the query is affirmatively answered, the process proceeds to step 412 where the video mosaic is aligned with the reference image using the "projective" algorithm. If the terrain is not locally flat, the process proceeds to step 414 where the "plane+parallax" algorithm is used to align the video mosaic and the reference image.

In order to assess the approximate accuracy of geo-referencing, a few points were manually selected in a video frame and the corresponding points manually identified in the reference image. Points in the reference image corresponding to those in the video were also identified using the geo-registration algorithms. FIG. 5 contains a table indicating the accuracy of located points in the reference with respect to the hand selected ones. Second and third columns in the table show the coordinates of the selected video points and the subsequent two columns show the corresponding points selected manually in the reference image. The last two columns show the points computed in the reference image by the geo-registration algorithm. Most correspondences are within 1 pixel accuracy with respect to the manually selected locations.

Once, the alignment parameters have been computed, the display generation module 206 can warp the reference image to the video image or vice versa, accurately overlay certain reference information onto the video image, and the like. In one embodiment of the invention the video images can be warped to the reference image. These video images can then be merged to construct geo-mosaics (geo-referenced video mosaics). These mosaics can be used to update the reference imagery. The video mosaics that are warped in this manner are coupled to the reference database module 204 along path 250 in FIG. 2.

For annotation and other visualization tasks, it is important for the user to be able to map points from the video to the reference image and vice versa. To map points from the reference image to the video, the invention uses equations 2 and 3 and computes the values on the right hand side. However, to map a video point to the reference image, equations 2 and 3 are solved using Newton's method in two steps, first equation 3 is solved and then use the results from equation 3 to solve equation 2.

Similarly, for warping the video image to the reference image, the invention can use reverse warping with bilinear interpolation (or some other form of interpolation, e.g., cubic interpolation. However, to warp the reference image to appear in the video image coordinates, the invention must use forward warping. Point mappings in the forward warping process are computed using the above technique.

To accomplish the overlay process, the display module contains a video mixer that combines the video and database information on the operator's reference overview image monitor window. Additionally, the overlay may include attached sound/text references for point and click recall of additional information pertaining to the imaged scene. As such, the video images can be mapped to the geo-spatial reference information or the geo-spatial reference information can be mapped to the video. This flexible integration of currently generated video and database information provides a rich source of accessible information for many applications.

The annotation information, the video and the transformation parameters are provided to the display module 206. The display module produces various user defined display formats. For example, the video or video mosaic can be overlaid atop the reference images or vice versa, annotation data can be overlaid atop the video, reference images and annotation information can both be overlaid atop the video images and so on. The database may further contain DEM maps and multi-modal annotations such as graphics, text, audio, maps and the like. Additionally, the video view can be used as an initial view of a scene, then the reference database imagery could be displayed as a synthetic view of the scene extrapolated from the original view as a virtual camera moves from the initial view through the scene, i.e., a synthetic "fly through."

Furthermore, objects in the video can be identified by the user and marked with a cursor. The system can accurately geo-locate the selected point with respect to the reference coordinate system.

In an alternative embodiment of the invention, a different process is used in the geo-spatial aligning module 202 of FIG. 1. This process identifies matching features even in oblique video and minimizes occlusion effects, since the rendering process performs hidden surface removal. Additionally, the various alternative embodiments discussed below provide robust geo-registration results.

Figure 6:
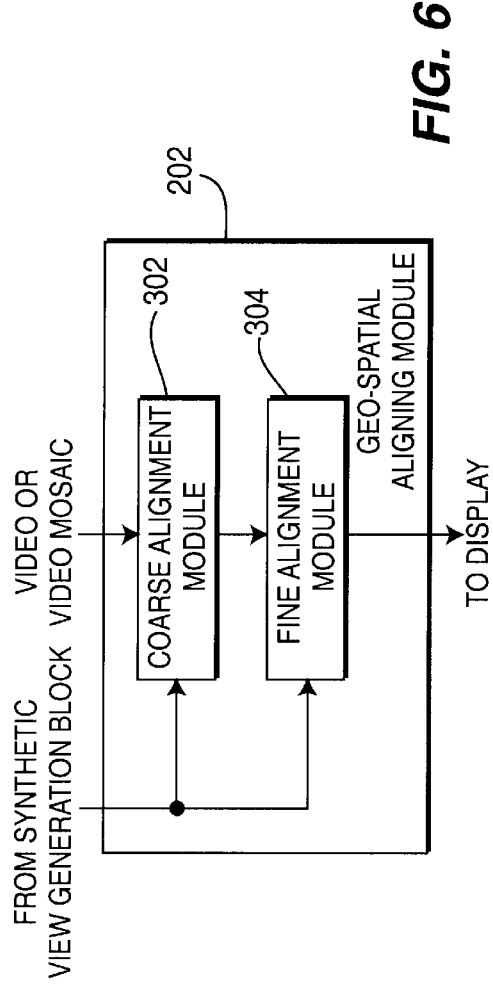
FIG. 6 is a functional block diagram of a second embodiment of the geo-spatial aligning module of FIG. 2.

FIG. 6 depicts a functional block diagram of alternative embodiment of the geo-spatial aligning module 202. In one illustrative embodiment of the invention, the module 202 comprises a coarse alignment module 602 and a fine alignment module 604 connected to one another in series. Additional alignment modules may be used to provide a plurality of alignment steps in an iterative alignment process. The coarse alignment module 602 receives either a video sequence or a video mosaic for processing. Both the coarse and fine alignment modules 602 and 604 are coupled to the synthetic view generation block 218. The alignment is performed in accordance to four factors. These factors include the pyramid level being processed, the tile size or spatial support range, the search range and the alignment. The parameters of these four factors are systematically varied in a coupled fashion to yield a multi-dimensional, coarse-to-fine refinement strategy. Intermediate levels of refinement may be inserted in the coarse-to-fine strategy. The coarse alignment module 602 provides an initial alignment between the video and rendered reference imagery (synthetic view). A pyramid level containing coarse resolution information is processed. The spatial area considered is typically a full video frame. The search range is fairly large, for example, on the order of one hundred meters. The alignment between the video frame and the reference imagery is a low-order approximation, e.g., a two-dimensional translation.

The fine alignment module 602 improves the alignment over the coarse alignment module 604. A pyramid level form the images containing more detailed information is processed. The spatial area comprises smaller tiles, e.g., 64×64 pixels, of the video frame. The search range in the fine alignment module 602 is much smaller, e.g., on the order of one meter. The alignment between the video frame and the reference imagery is more detailed, e.g., a two-dimensional projective homography.

In another embodiment, the coarse alignment module, e.g., a coarse indexing module, locates the video imagery more precisely in the rendered reference image. An individual video frame may not contain sufficient information to perform robust matching. Therefore, results of the frame-to-frame alignment, e.g., alignment parameters, from the interframe alignment module 920 are combined across multiple frames.

Local appearance matching is performed using a normalized correlation of multiple image patches in the image. These individual correlation surfaces often have multiple peaks. Disambiguation is obtained by imposing global consistency by combining the frame-to-frame motion information with the correlation surfaces. The correlation is performed independently in each band of a multiresolutional representation of the video frames and reference imagery. The correlation surfaces are generated by dividing the reference image into a plurality of "patches", moving the patches as they are compared to the video images, and determining regions of correlation within each patch, i.e., an identified feature. The correlation-based search is performed across a range of rotation, translation and zoom motion parameters. The net result is that the sequence of frames is registered to within a few pixels in the reference frame. The final correlation score is used as a measure of accuracy in the coarse search step.

The fine alignment module 604, e.g., fine geo-registration module, then refines this estimate further using the relative information between frames to constrain the solution. In general, the transformation between two views of a scene can be modeled by: (i) an external coordinate transformation that specifies the 3D alignment parameters between the reference and the camera coordinate systems, and (ii) an internal camera coordinate system to image transformation with typically involves a linear (affine) transformation and non-linear lens distortion parameters. The approach combines the external coordinate transformation and the linear internal transformation into a single 3D projective view transformation. Twelve parameters ($a_1$ to $a_{12}$) are used to specify the transformation. The reference image coordinates ($X_r$, $Y_r$) are mapped to the ideal video coordinates ($X_I$, $Y_I$) by equation (7) below:

$$X_I = \frac{a_1 * X_r + a_2 * Y_r + a_3 + k(X_r, Y_r) + a_{10}}{a_7 * X_r + a_8 * Y_r + a_9 + k(X_r, Y_r) + a_{12}} \quad (7)$$

$$Y_I = \frac{a_4 * X_r + a_5 * Y_r + a_6 + k(X_r, Y_r) + a_{11}}{a_7 * X_r + a_8 * Y_r + a_9 * k(X_r, Y_r) + a_{12}}$$

This transformation together with the DEM data and any non-linear lens distortion parameters completely specifies the mapping between pixels in the video frame and the reference imagery. One major advantage of this approach is that camera calibration need not be known. This increases the applicability of the system to arbitrary video camera platforms. Note that in many aerial imaging instances, equations (7) can be reduced to be a two-dimensional projective transform (where the terms $a_3=a_6=a_9=0$). This approximation is valid when there is only a small view-point difference between the rendered reference image and the video frame and the distance between camera to ground is large as compared to the height of objects in the scene. The approximation is also valid when the camera undergoes rotation only.

Previous approaches to the fine alignment problem perform fine alignment of each frame separately. The alignment parameters would be estimated by minimizing the following equation $$E(\{A\}) = \sum_x ((I(x, ref) - I(Ax, video))^2 \quad (8)$$

using a multi-resolution coarse-to-fine estimation process and warping with Gaussian or Laplacian pyramids. However, the individual video frames may be quite different from the reference imagery. This can be due to multiple reasons such as changes in the world, different image acquisition times, different imaging sensors used, etc. Additionally, due to an aperture effect, certain video frames may not have sufficient distinguishing information to match them to the reference imagery. For instance, images of runways do not have distinguishing features for reliable matches along the runway direction. To mitigate against these effects, this method matches a block of frames simultaneously to the reference imagery (e.g., one or more reference images). The block of frames would provide a larger context for robust matching. The frame-to-frame alignment within the block can be stable because of local features.

Figure 7:
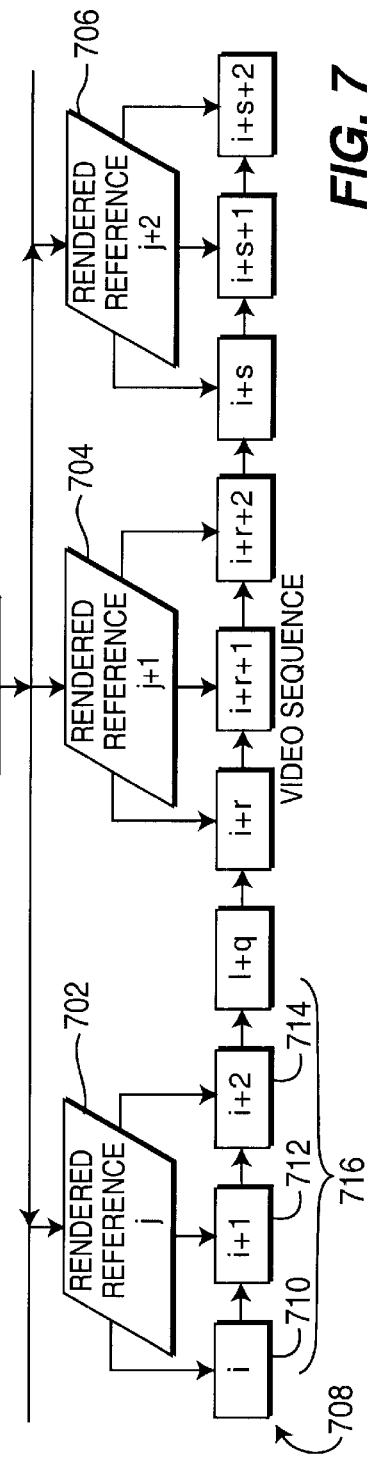
FIG. 7 is a diagram representing image bundling.

In the block-based approach, the results from the frame-to-frame processing are used to constrain the simultaneous alignment of several sets of frames to a set of rendered reference images. As noted earlier, the process matches the video frames to rendered reference images whose perspective is close to the video frame. In the block alignment process for an oblique video sequence, different video frames will be matched to different rendered reference images as depicted in FIG. 7. However, since the process has rendered the reference images, the relationship between the video frames and the rendered reference images is completely known. Tie-points are established between the reference frames and video frames and between different video frames. To solve for frame-to-reference parameters, the following error term $$E = \sum_{i=1}^{k} E_{f2f}(i, i+1) + \sum_{j=1}^{m} \sum_{l=1}^{k} E_{r2f}(j, i) \quad (9)$$

is minimized. E is the sum of the frame to frame matching errors ($E_{nf}$) and rendered reference frame to video frame matching errors ($E_{r2f}$). These errors are a function of the frame to reference motion parameters in equation (7).

FIG. 7 depicts three rendered reference images 702, 704, and 706 with video frames 708 tied to each rendered reference image 702, 704 and 706. In practice, the number of rendered reference images depends on the motion of the video in a bundle set (e.g., the three images 710, 712, and 714 form a bundle set 716). The number of video frames used in a bundle depends on there being enough multi-directional features present at the two ends of the bundle to be able to tie them robustly to the reference imagery.

Figure 8:
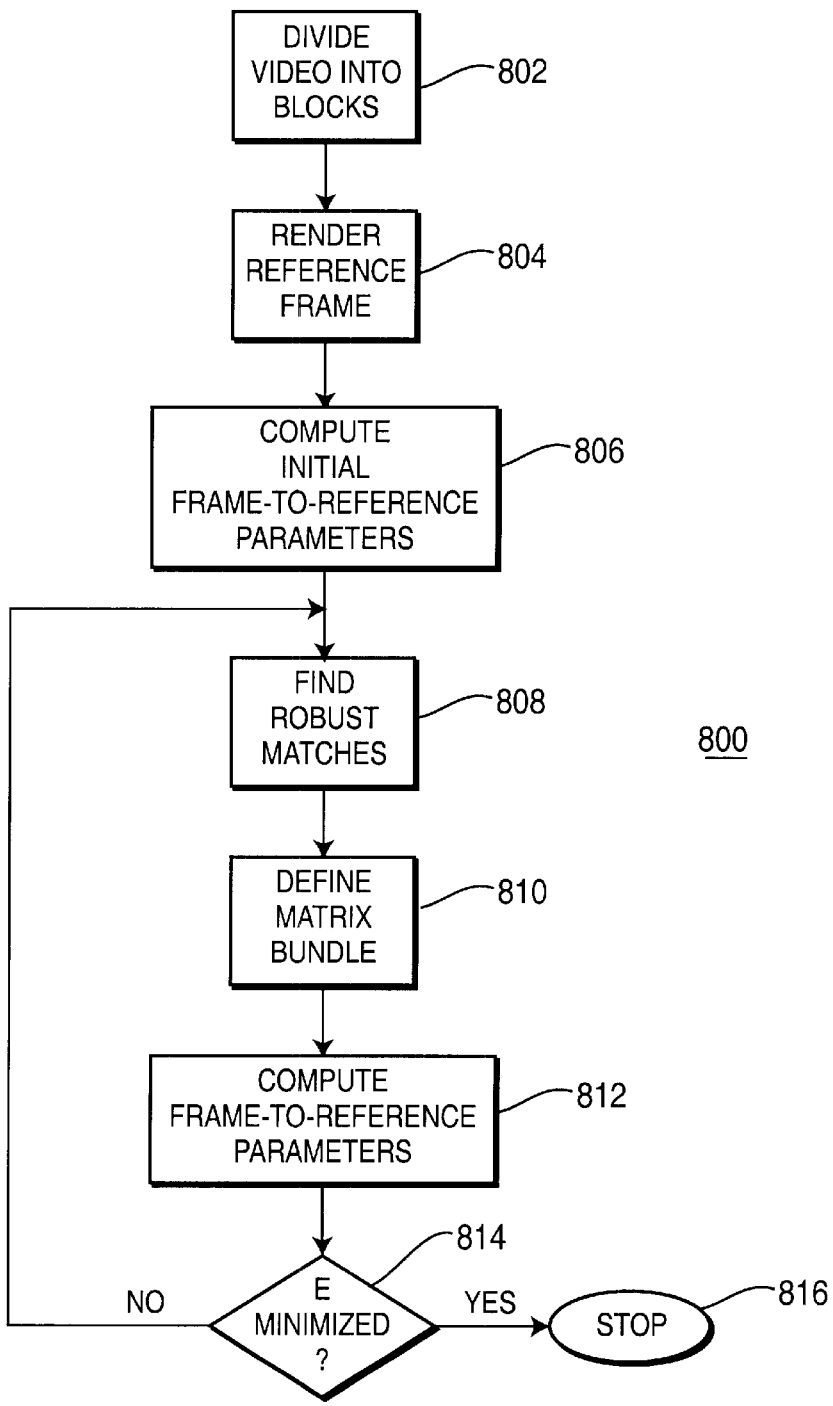
FIG. 8 is a flow diagram of a bundle estimation process.

FIG. 8 depicts a flow diagram of an illustrative bundle estimation process 800 is used to establish matches and compute alignment parameters between the reference imagery and the video frames:

Step 802—Divide the video into blocks based on the frame-to-frame motion computation.

Step 804—Render a reference frame for each block using a central viewpoint for the block.

Step 806—Compute initial frame-to-reference parameters for each frame using either the coarse search and ESD results or the predicted motion based on the frame to frame motion computation.

Step 808—Find robust matches between significant points in the video frames and the rendered reference images. This is accomplished by computing optic flow between the respective two images or using the tie-point technique discussed above.

Step 810—Define a matrix bundle of correspondences where both correspondences between reference frames and video frames and correspondence between one video frame to the next are established. Common tie points are used to link both neighboring video frames to each other and to neighboring reference frames.

Step 812—Compute frame to reference parameters by minimizing the pixel correspondence error (equation 9) using the bundle set of equations set up in step 808. Calculate the point matching error using the estimated parameters.

Step 814—The process 800 queries whether the error term E of equation 9 is minimized. If the query is negatively answered, the process 800 iterates steps 808 to 812, until there is convergence in the minimization of the error term E in equation (9). The estimated motion parameters are used to find better matches and these are in turn used to refine the frame to motion parameters. Upon convergence, the process 800 stops at step 816.

Note that the bundle adjustment process was used to refine both the matches in step 808 and the motion parameters in step 812. For real time applications, a sliding sub-block process is used, where a new sub-block of frames is added at each time instant and an earlier sub-block is removed from the block estimation. In the case of nadir imagery, there is only one rendered reference image and all the video frames can be matched to the one rendered reference frame. The video frames can be registered to the reference frame or the reference frame can be registered to the video frames. Furthermore, it is contemplated as with the scope of the invention, that each video frame may be registered to an individual reference image.

Figure 9:
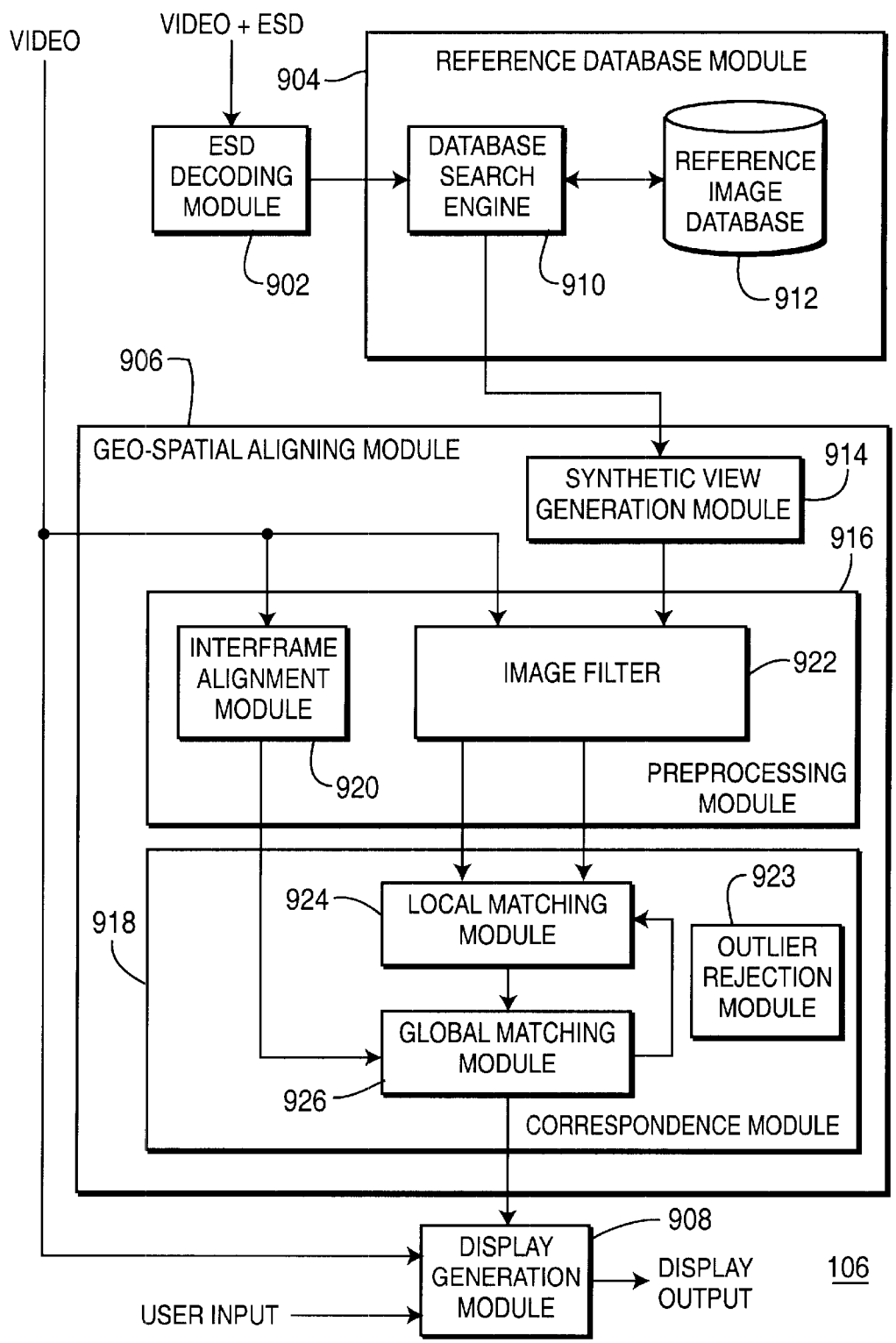
FIG. 9 depicts a block diagram of another embodiment of the present invention.

FIG. 9 depicts a functional block diagram of another embodiment of the geo-registration system 106 of FIG. 1. Illustratively, the system 106 is depicted as processing a video signal as an input image; however, from the following description those skilled in the art will realize that the input image (referred to herein as input imagery) can be any form or image including a sequence of video frames, a sequence of still images, a still image, a mosaic of images, a portion of an image mosaic, and the like. In short, any form of imagery can be used as an input signal to the system of the present invention.

The geo-registration system 106 comprises an engineering support data (ESD) decoding module 902, a reference database module 904, a geo-spatial aligning module 906, and a display generation module 908. ESD is supplied with video to the system 100 in the form of global positioning system (GPS) data, camera look angle data, telemetry data, metadata, and the like. The ESD decoding module 902 decodes or extracts the ESD to define an initial estimate of the camera model, e.g., position and attitude, with respect to the reference database module 904.

The reference database module 904 comprises a reference image database 910 and a database search engine 912. The reference image database 910 stores reference imagery that is geodetically calibrated with respect to the input video. Formats of the reference imagery (referred to herein as reference images or reference frames) include an orthoimage, a digital elevation map (DEM), geospatial data, and the like. The database search engine 912 uses the decoded ESD to select a reference image from the reference image database 910.

The geo-spatial aligning module 906 comprises a synthetic view generation module 914, a preprocessing module 916 and a correspondence module 918. The synthetic view generation module 914 applies the decoded ESD or the estimate of the camera model to apply an image perspective transformation to the reference imagery from the database. This provides an initial alignment between the reference image and the video image. The transformed reference imagery is a synthetic reference image from the perspective of the sensor or camera, and is herein referred to as a "rendered image".

The image perspective transformation represents a projection from the reference image into the video frame. In one embodiment, a standard texture-map based rendering is used to perform the projection. Initially, the DEM is triangulated to yield a three-dimensional (3D) mesh. The reference image, e.g., orthoimage, is regarded as a texture that is coregistered to the 3D mesh. Next, the vertices of the 3D mesh are parametrically mapped to the image, based on a telemetry implied camera projection matrix. Hidden surfaces are then removed through the use of Z-buffering. The result is a view, r, of the reference image according to a rough initial indication of the camera model provided by telemetry or decoded ESD. Alternatively, other rendering processes can be used such as projective transformation.

Throughout this discussion, mappings between points are presented in various coordinate frames, e.g., between world coordinates and image coordinates, between multiple image coordinates. Illustratively, these mappings will be represented in terms of a 4×4 transformation matrix Π operating on 4×1 column vectors, $m=(x,y,z,w)^T$ i.e., $$m_{out} = \Pi m_{in} \quad (10)$$

Specific forms of Π, $m_{in}$ and $m_{out}$ will be discussed below. Video frames and projected reference images will be denoted as v and r respectively; particular points will be denoted with j. For example, homogeneous coordinates for a corresponding point in the video frame and the reference image will be symbolized as $m_{v_j}$ and $m_{r_j}$ respectively. Two-dimensional image coordinates for the same point will be given as $P_{v_j} = (u_j, v_j)_v = (x_j/w_j, y_j/w_j)^T$, as standard.

To represent the mapping from the reference frame to the video frame, the general point transformation matrix Π is specialized to:

$$P_{w,r}^{render} = \begin{pmatrix} a_{11} & a_{12} & a_{13} & a_{14} \\ a_{21} & a_{22} & a_{23} & a_{24} \\ 0 & 0 & 0 & 1 \\ a_{41} & a_{42} & a_{43} & a_{44} \end{pmatrix} \quad (11)$$

These entries in the above matrix are derived via composition of the camera interior and exterior orientation parameters that is applied to vertices of the triangulated mesh. Input world points are symbolized by $m_{w_j}$ and output projected points are symbolized by $m_{r_j}$. To account for inaccuracies in telemetry-based projection, i.e., projection using ESD, the support of the area covered in the projected or rendered reference image is extended beyond the implied field of view. For efficiency in geo-registration, the reference images are not necessarily projected for every frame of the video sequence, but on an intermittent basis when the last registered video frame is near the border of the current reference projection. The reference images are re-rendered if the scene in the video sequence substantially changes.

The video images and rendered image are then coupled to the preprocessing module 916 comprising an interframe alignment module 920 and an image filter 922. Video frames, typically transmitted at 30 frames per second, often contain significant interframe or frame-to-frame overlap. To meet the real time constraints for the geo-registration system 106, this redundancy is exploited by identifying "key frames" or key video frames based on computing frame-to-frame motion. One embodiment of a key frame is a frame in the video sequence where the overlap between the key frame and a previous frame is below a threshold value, e.g., below fifty percent overlap. Other embodiments of identifying key frames include situations when three-dimensional effects invalidate the next video frame.

The frame-to-frame motion is modeled with low order parametric transformations like translation, affine and projective transformations. See Bergen et al., "Hierarchical Model-based Motion Estimation", Proceedings of the Second European Conference on Computer Vision, pp. 237–252, 1992. The interframe alignment module 920 generates frame to frame parameters that enable the creation of a single extended view mosaic image that authentically represents all the information contained in the aligned input frames in a compact image.

Although this embodiment of the invention may align individual video frames with the reference image, any single frame in the video sequence may lack sufficient distinctive structure to disambiguate matching to a reference image. To ameliorate this problem, collections of frames may be considered simultaneously for effectively increasing the field of view considered in the matching process. To facilitate such matching, the frame-to-frame alignment of adjacent frames in the video sequence is recovered. The recovered parameters are subsequently used as geometric constraints in the matching of collections of frames to reference imagery.

The frame-to-frame alignment is recovered as an affine (or other) mapping. In an embodiment using affine mapping is a specialized form of the general transformation matrix Π in accordance with:

$$F_{v,v+1}^{affine} = \begin{pmatrix} a_{11} & a_{12} & 0 & a_{13} \\ a_{21} & a_{22} & 0 & a_{23} \\ 0 & 0 & 1 & 0 \\ 0 & 0 & 0 & 1 \end{pmatrix} \quad (12)$$

where the input format of the mapping is $m_{v_j} = (x_j, y_j, 0.1)_v^T$ and the output of the mapping is $m_{v+1_j} = (x_j, y_j, 0.1)_{v+1}^T$. The affine transformation has been empirically determined to provide an adequate description of frame-to-frame alignment for video rate, e.g., 30 frames per second aerial imagery of concern. The alignment parameters for matrix F are recovered via a gradient-based, coarse-to-fine, Gauss-Newton estimation working over a Laplacian pyramid. For a collection of n video frames, a collection of n−1 alignment matrices are calculated for subsequent processing.

The video frame and the rendered reference image are then filtered by the image filter 922. In one embodiment, the image filter 922 decomposes the video frame and rendered reference image into Gaussian and Laplacian pyramids. The Gaussian pyramid is a low-pass representation of the video and rendered reference images. The Laplacian pyramid is a bandpass representation of the video and rendered reference frames.

However, the appearance between a video and its corresponding reference imagery, e.g., orthoimage, may change greatly, even following projection to a common coordinate frame. Many sources contribute to this change, including variation in sensor characteristics, diurnal and seasonal cycles and scene structure (e.g., new construction). To ameliorate such difficulties, an image intensity representation of the video frame and rendered reference image is provided in an alternative embodiment of the invention. The image intensity representation highlights pattern structure that is common to the two image sources that are to be brought into alignment.

Features with the potential to serve in the desired fashion are those that exhibit a local dominant orientation or well localized point-like structures that can be thought of as capturing a range of orientation, e.g., roads, tree lines, edges of buildings, compact isolated structures and the like. Similarly, the local distribution of orientations that are present in an image can be indicative of texture structure. Correspondingly, an image representation is employed that decomposes intensity information according to local spatial orientation. This representation is derived via application of a bank of filters that are tuned for any orientation and scale to both the video imagery as well as the (projected) reference image. In one embodiment of the invention, the filtering has been implemented in terms of second derivative of Gaussian filters, $G_{2\theta}$ at orientation $\theta$ and their Hilbert transforms, $H_{2\theta}$. The filters are taken in quadrature (i.e., for any given $\theta$, $G_{2\theta}$ and $H_{2\theta}$ in tandem) to eliminate phase variation by producing a measure of local energy, $e_\theta(x,y)$ within an orientation band, according to $$e_\theta(x,y) = (G_{2\theta}(x,y)*i(x,y))^2 + (H_{2\theta}(x,y)*i(x,y))^2 \qquad (13)$$

with * symbolizing convolution and i(x,y) images to be filtered, i.e., for video frames and rendered reference images. Although the filters can be designed for any orientation or scale, in one embodiment of the invention, the filtering is applied at a set of four orientations, vertical, horizontal and two diagonals to yield a corresponding set of "oriented energy images" for both the video frame and reference imagery. The filters are referred to herein as oriented filters. Further, the entire representation is defined over a Gaussian pyramid to support multiresolution analysis during subsequent processing in the correspondence module 918. The correlation is performed independently in each band of the multiresolutional image representation. The outputs of the filters are combined, e.g., summation or multiplication.

Owing to the rectification of the oriented filter outputs, the oriented energy representation is invariant to contrast reversals. Still the value of any one oriented energy measure is a function of both orientation and contrast. To avoid this confound and get a purer measure of orientation, the response of each filter is normalized by the sum of the consort, i.e., $$\hat{e}_{\theta_k}(x, y) = \frac{e_{\theta_k}}{\sum_k e_{\theta_k(x,y)} + \varepsilon} \qquad (14)$$

with k ranging over the four orientations and $\varepsilon$ a small bias to prevent instabilities when overall energy is small. In one implementation, the bias is set to about 1% of the maximum (expected) energy. The final set of normalized oriented energies comprises an image representation that captures the local first-order geometric structure of image patterns with robustness to contrast variation. The normalized orientated energy images, as defined by equations (13) and (14), are used to perform matching operations between the video frame and projected reference in the correspondence module 918.

The correspondence module 918 establishes a detailed spatial correspondence between the video frame and the projected, i.e., rendered, imagery to effect a precise geometric alignment between the video frame and projected image. To establish the precise geometric alignment, the correspondence module 918 must account for various factors. For example, large search ranges are required due to uncertainty in camera geometry, e.g., as provided by telemetry and other ESD. Matching with small spatial support leads to ambiguity in matching, while large spatial support can be too sensitive to change between video and reference.

The correspondence module 918 comprises a local matching module 924 and a global matching module 926 to employ a local to global matching with progressive refinement. The module simultaneously considers a collection of consecutive video frames that moves across the input stream with a sliding window. In one implementation collections of 3 "key" frames are considered at a time, with key frame selected to have 50% overlap and their frame-to-frame alignments taken as the concatenation of the video rate frame-to-frames estimates.

Initially, the local matching module 924 establishes correspondences on the basis of purely local matching, i.e., matching between single video frames and projected reference image. Subsequently, the global matching module 926 establishes global alignment via a procedure that simultaneously considers all local correspondences for all frames under consideration to estimate a set of alignment parameters optimized for all frames. This is similar to a bundle adjustment.

In one embodiment of the invention, the two stage, i.e., local and global, matching is iterated in a progressive refinement framework. Other iterative strategies are also applicable. Early iterations in the correspondence module 918 effect a "coarse alignment" via consideration of matching primitive based on low spatial frequency information derived with large spatial support to serve large search ranges but low-order alignment models. Later iterations in the correspondence module 918 effect a "fine alignment" via consideration of matching primitive based on higher spatial frequency information to serve smaller search ranges and higher-order alignment models. At each stage, results at the previous stage serve as initial conditions, with telemetry or ESD providing the initial estimate for the entire routine. The local and global matching, as well as the progressive refinement, will be further discussed below.

Local matching concentrates on establishing correspondence between individual video frames and the reference image. Primitives for this stage of processing are spatially overlapping tiles that define a grid over a frame of concern. The size and scale of the tiles, e.g., at a pyramid level, vary according to the progressive refinement strategy. In one implementation, three refinements are performed, coarse, medium and fine. For example, in the coarsest stage of refinement, a tile is the entire image taken in level 3 in a Gaussian pyramid. Similarly, at the finest stage of refinement, a 6×8 grid of tiles is formed at pyramid level 1. Note that the oriented energy representation is built on top of the Gaussian pyramid level to affect an overall bandpass characteristic in the filtering of the tiles.

Primitives, e.g., tiles, are matched in terms of correlation search in translation over the projected or rendered reference image. The search range varies according to the progressive refinement iteration, from hundreds of pixels at the coarsest stage to single pixels at the finest stage. The resulting match for a primitive is represented as a function $\Gamma_{v_j}(u,v)$, giving "probability" that point j in a given video frame, v, has displacement ($\mu$,v) in a reference image, r. Match functions are computed as normalized correlation scores of a patch about j and v shifted by ($\mu$,v) in r (i.e., a discrete correlation surface). Independent correlation surfaces are computed for each band in the oriented energy representation, which subsequently are multiplied together to establish consensus. By representing the local matches in terms of correlation surfaces, it is possible to eliminate the assignment of unique displacement vectors where they are unwarranted (e.g., aperture effects) and make use of more of the available information in subsequent processing.

To serve as a constraint on global matching, the dominant peak (i.e., highest value, in a correlation surface, $\Gamma_{v_j}$ is further characterized in terms of its covariance structure. In particular, let $\gamma(\mu,v)$ correspond to a portion of the correlation surface $\Gamma$ that derives from its dominant mode. Support for $\gamma$ is recovered based on a mean-shift procedure (or other statistical procedure) that iteratively reassigns points to local maxima in the distribution of $\Gamma$. The covariance of $\gamma$ is defined as $$C = \sum_{\mu,v=-\theta}^{\theta} \gamma(\mu, v)\overline{p}\overline{p}^T \Big/ \sum_{\mu,v=-\theta}^{\theta} \gamma(\mu, v) \quad (15)$$

where $\overline{p}=(\mu-\mu_0, v-v_0)^T$ with $\mu_0=\Sigma\mu\gamma(\mu v)/\Sigma\gamma(\mu v)$, similarly for $v_o$ and limits on the summation the same as for C, i.e., so as to cover $\gamma$. Finally, the scale of the peak is used as a normalization to yield a measure of covariance shape $$\overline{C} = CTr(C^{-1})/2. \quad (16)$$

The final component of local matching is outlier rejection that is performed by the outlier rejection module 923. Although outlier rejection is being described with reference to FIG. 9, the outlier rejection procedure can be used in the embodiment of FIG. 2 within the coarse alignment module. Due to the difficulty of the matching problem that is under consideration, false local matches are likely and must be removed to avoid corruption of global matching. Indeed, experience has shown that false matches can exceed 50% in the initial matching stage. Since true matches must be consistent with some alignment model, RANdom SAmple Consensus (RANSAC) is applied on a frame-by-frame basis to estimate that model and remove outliers among the matches. RANSAC is disclosed in detail in M. Fischler, R. Bolles, "Random Sample Consensus: A Paradigm For Model Fitting With Applications To Image Analysis And Automated Cartography," CACM 24(6), 381–395, 1981. Those skilled in the art will realize from this disclosure that other models can be used in lieu of RANSAC o perform outlier rejection. The specific alignment models considered will be introduced in the discussion of global matching below. For now, it suffices to note that the models can be represented parametrically to map between the projected reference and video imagery, i.e., according to transformation in equation (10). In one implementation, the residual $R_j^2$, for point j used in the RANSAC computation is taken to be the covariance weighted distance $$R_j^2 = (p_{v_j} - \overline{p}_{v_j})^T \overline{C}^{-1}(p_{v_j} - \overline{p}_{v_j}) \quad (17)$$

with $\overline{p}_{v_j}=(\overline{\mu}_v,\overline{v}_v)_j$ mappings of the reference point $p_{r_j}$ into the video under the current trial's estimated alignment model. For cases where RANSAC cannot be defined, i.e., coarse matches of entire video frames to projected reference outliers are rejected by dropping matches that do not derive from unimodal correlation surfaces, $\Gamma$. The overall result is a set of (local) video to reference matches for each frame under current consideration, all of which are to be considered during global matching.

The global matching module 926 performs global matching with respect to an operative parametric alignment model $Q_{r,v}$ that maps between the projected reference(s) r and video frames v to serve in essence as a camera model. Estimation proceeds by simultaneously recovering parameters for a set of mappings for a corresponding set of video frames under consideration in a sliding temporal window, which is similar to a photogrammetric bundle adjustment. During this process, multiple projected references may also be under consideration, as it becomes necessary to project more than one view of the reference orthoimage to accommodate the extent of the current collection of video frames.

Most generally, the form of the mapping $Q_{r,v}$ is as given in the general transformation in equation (10), with input $m_{r_j}=(x_j,y_j,0.1)_r^T$ and output $m_{v_j}=(x_j,y_j,0,w_j)_v^T$. Depending on the stage of progressive refinement, different alignment models are employed. Lower order alignment models are used during coarse alignment and higher order alignment models are used during fine alignment. During the coarse iteration, a global shift is employed to establish the center of projection, i.e., $$Q_{r,v}^{shift} = \begin{pmatrix} 1 & 0 & 0 & a_{14} \\ 0 & 1 & 0 & a_{24} \\ 0 & 0 & 1 & 0 \\ 0 & 0 & 0 & 1 \end{pmatrix} \quad (18)$$

During the intermediate iteration, an affine camera model is employed, i.e., $Q_{r,v}^{affine}$ has the same form as the frame-to-frame transformation $F_{v,v+1}^{affine}$ in equation (12). Finally, during fine alignment, a 2D projective camera model is employed, i.e., $$Q_{r,v}^{2dProj} = \begin{pmatrix} a_{11} & a_{12} & 0 & a_{14} \\ a_{21} & a_{22} & 0 & a_{24} \\ 0 & 0 & 1 & 0 \\ a_{31} & a_{32} & 0 & a_{34} \end{pmatrix} \quad (19)$$

This last model in equation (19) is related to the general 3D projective camera model, e.g., which was used for projecting the reference to video frame in equation (11). The relation between equations (19) and (11) assumes that the z terms deviate little from a plane to yield a sparser projection matrix, in particular, an homography mapping between two planes. The local planarity assumption is based on the ability of the projection of the reference to the video coordinate frame to compensate for significant 3D relief effects. In general, additional modeling stages, e.g., full 3D projective in equation (11), may be included.

Given an operative alignment model, the global matching module 926 considers two sets of constraints in order to achieve an overall best alignment between the portion of the video frame under consideration and the reference imagery. These constraints include frame-to-frame constraints and reference-to-frame constraints. Frame-to-frame constraints are derived from the frame-to-frame alignments computed in the interframe alignment module 920. Reference-to-frame constraints are derived from the reference-to-video frame matches that were computed by local matching. These two constraints will be further described below.

Frame-to-frame constraints embody the frame-to-frame alignments that were computed as a part of the image preprocessing. Deviations from these constraints are measured in terms of the geometric displacement between the same point j as it appears in a projected reference, and the mapping of that point onto a video frame, then to the next frame and finally back to the projected reference. In the most general case, two projected references will be involved, e.g., when the two video frames involved are related to separate projected references, leading to an error term of the form $$E_{f2f} = \delta(m_{r+1_j}, Q_{r+1,v+1}^{-1} F_{v,v+1} Q_{r,v} m_{r_j}) \quad (20)$$

where the reference point pair $m_{r_j}, m_{r+1_j}$ are obtained using the known world to projected reference mapping, i.e., as provided by the transformation in equation (11), while the composite projection is a chain of mappings from reference r to frame v, then to frame v+1 and finally to reference r+1. Here, frame-to-frame alignment is given by $F_{v,v+1}$ in accord with transformation equation (12) as a constraint, while mappings from video frames v,v+1 to projected reference images r,r+1 are described by $Q_{r,v}^{-1}, Q_{r+1,v+1}^{-1}$, respectively and $\delta(m_\alpha, m_\beta)$ is a distance metric. In one illustrative embodiment of the invention, this metric is instantiated in terms of the covariance weighted Euclidean distance between the relevant 2D (image) coordinates, i.e., $p_\alpha = (x_\alpha/w_\alpha, y_\alpha/w_\alpha)^T$ and similarly for $\beta$ to yield $$\delta(m_\alpha, m_\beta) = (p_\alpha - p_\beta)^T C^{-1} (p_\alpha - p_\beta) \quad (21)$$

As a special case, if the two video frames, v and v+1, related via a frame-to-frame constraint, $F_{v,v+1}$, map to the same projected reference, then the frame-to-frame error term has the same form but with r and r+1 equated. Other error functions can be used.

Reference-to-frame constraints embody the local matches that were computed during the first stage of the correspondence process. Deviations from these constraints are measured in terms of the geometric displacement between a local match and mapping of the same point j onto a common reference from a corresponding video frame, i.e., $$E_{r2f} = \delta(m_{r_j}, Q_{r,v}^{-1} M_{v_j}) \quad (22)$$

with $m_{r_j}$ the position of the point $m_{v_j}$ in reference r given by local matching and $Q_{r,v}$ to be estimated in global matching.

The combination of the frame-to-frame and reference-to-frame error terms leads to a total error $$E = \Sigma(\alpha_1 E_{f2f}^2 + \alpha_2 E_{r2f}^2) \quad (23)$$

that is to be minimized with respect to the reference-to-frame mapping $Q_{r,v}$. Here, summation is taken over all local matches computed for a set of video frames under simultaneous consideration and weights $\alpha_{1,2}$ determine the relative contribution of each error term. In one implementation, $\alpha_1$ and $\alpha_2$ are equal. Minimization of E is accomplished in a weighted last sequence sense, with weights provided by local match covariance. Estimation of the parameters for the mapping $Q_{r,v}$ is performed via the Levenberg-Marquardt method. Other estimation methods can also be used such as Gauss-Newton.

The output from the global matching module 926 is a detailed registration of the two sources of imagery allows the video to inherit the geodetic coordinates of the reference. Also, via a composition of the recovered alignment models with the initial telemetry-based camera model, the global matching module 926 produces adjusted model parameters that reflect the available video and reference information.

Throughout the foregoing disclosure, the reference imagery was generally referred to as being registered or warped into alignment with the video images or frames. However, those skilled in the art will recognize that the video images can be registered or warped into alignment with the video images. In a further generalization, the video images and the reference images could be warped to an arbitrary reference coordinate system that is the reference coordinate system of the video images, the reference images or a coordinate system that is not associated with an of the images.

Although various embodiments which incorporate the teachings of the present invention have been shown and described in detail herein, those skilled in the art can readily devise many other varied embodiments that still incorporate these teachings.

What is claimed is:

1. A system for performing geo-spatial registration of an input image and geodetically calibrated reference imagery comprising:

a reference database module containing geodetically calibrated reference imagery for producing reference imagery relating to imagery in said input image;

an preprocessor for processing the input image and said reference imagery using an oriented filter; and an alignment module for aligning said preprocessed input image and said preprocessed reference imagery;

wherein said input is an image mosaic.

2. A system for performing geo-spatial registration of an input image and geodetically calibrated reference imagery comprising:

a reference database module containing geodetically calibrated reference imagery for producing reference imagery relating to imagery in said input image, wherein said geodetically calibrated reference imagery comprises position information with respect to the Earth;

a preprocessor for processing the input image and said reference imagery using an oriented filter; and an alignment module for aligning said preprocessed input image and said preprocessed reference imagery by performing oriented matching.

3. The system of claim 2 wherein said input image is an image mosaic.

4. The system of claim 2 further comprising:

an outlier rejection module for removing inaccurate correlations between said preprocessed input image and said preprocessed reference image.

5. The system of claim 2 wherein said alignment module registers said preprocessed input image to said preprocessed reference imagery.

6. The system of claim 2 wherein said alignment module registers said preprocessed reference imagery to said preprocessed input image.

7. A system for performing geo-spatial registration of an input image and geodetically calibrated reference imagery comprising:

a reference database module containing geodetically calibrated reference imagery for producing reference imagery relating to imagery in said input image;

an alignment module for aligning said input image and said reference imagery by performing oriented matching of features in said input image and said reference imagery; and an outlier rejection module for removing inaccurate feature correlations between said preprocessed input image and said preprocessed reference image.

8. The system of claim 7 wherein said input image is an image mosaic.

9. The system of claim 7 wherein said alignment module registers said input image to said reference imagery.

10. The system of claim 7 wherein said alignment module registers said reference imagery to said input image.

11. A system for performing geo-spatial registration of an input image an input image and geodetically calibrated reference imagery comprising:

a reference database module containing geodetically calibrated reference imagery for producing reference imagery relating to imagery in said input image, wherein said geodetically calibrated reference imagery comprises position information with respect to the Earth; and an alignment module for aligning said input image and said reference imagery by performing oriented matching of features in said input image and said reference imagery.

12. The system of claim 11 wherein said alignment module registers said input image to said reference imagery.

13. The system of claim 11 wherein said alignment module registers said reference imagery to said input image.

14. A system for performing geo-spatial registration of an input image and geodetically calibrated reference imagery comprising:

a reference database module containing geodetically calibrated reference imagery for producing reference imagery relating to imagery in said input image, wherein said geodetically calibrated reference imagery comprises position information with respect to the Earth; and an alignment module for aligning said input image and said reference imagery by performing oriented matching of features in said input image and said reference imagery, wherein said input image is in image mosaic.

15. A system for performing geo-spatial registration of an input image and geodetically calibrated reference imagery comprising:

a reference database module containing geodetically calibrated reference imagery for producing reference imagery relating to imagery in said input image, wherein said geodetically calibrated reference imagery comprises position information with respect to the Earth;

an alignment module for aligning said input image and said reference imagery by performing oriented matching of features in said input image and said reference imagery; and an outlier rejection module for removing inaccurate feature correlations between said input image and said reference image.

16. A system for performing geo-spatial registration of a sequence of input images and geodetically calibrated reference imagery comprising:

a reference database module containing geodetically calibrated reference imagery for producing reference imagery relating to imagery in said input images, wherein said geodetically calibrated reference imagery comprises position information with respect to the Earth; and an alignment module for simultaneously aligning a plurality of input images from said sequence of input images to said reference imagery by performing oriented matching.

17. The system of claim 16 wherein said alignment module further comprises:

a coarse alignment module for coarsely aligning said reference imagery and said input images.

18. The system of claim 17 wherein said alignment module further comprises:

a fine alignment module for accurately aligning said coarsely aligned input images and said reference image.

19. A system for performing geo-spatial registration of a sequence of input images and geodetically calibrated reference imagery comprising:

a reference database module containing geodetically calibrated reference imagery for producing reference imagery relating to imagery in said input images, wherein said geodetically calibrated reference imagery comprises position information with respect to the Earth;

an alignment module for simultaneously aligning a plurality of input images from said sequence of input images to said reference imagery by performing oriented matching; and a preprocessor module for orientation filtering said reference imagery and said input images.

20. The system of claim 19 wherein the preprocessor module further comprises an interframe alignment module.

21. A system for performing geo-spatial registration of a sequence of input images and geodetically calibrated reference imagery comprising:

a reference database module containing geodetically calibrated reference imagery for producing reference imagery relating to imagery in said input images, wherein said geodetically calibrated reference imagery comprises position information with respect to the Earth;

an alignment module for simultaneously aligning a plurality of input images from said sequence of input images to said reference imagery by performing oriented matching, and a synthetic view generation block for warping said reference imagery to have a viewpoint similar to a viewpoint of a sensor that produced said input images.

22. A system for performing geo-spatial registration of a sequence of input images and geodetically calibrated reference imagery comprising:

a reference database module containing geodetically calibrated reference imagery for producing reference imagery relating to imagery in said input images, wherein said geodetically calibrated reference imagery comprises position information with respect to the Earth;

an alignment module for simultaneously aligning a plurality of input images from said sequence of input images to said reference imagery by performing oriented matching, a local matching module for aligning a plurality of said input images to one another; and a global matching module for simultaneously aligning the aligned plurality of input images and the reference image.

23. A system for performing geo-spatial registration of a sequence of input images and geodetically calibrated reference imagery comprising:

a reference database module containing geodetically calibrated reference imagery for producing reference imagery relating to imagery in said input images, wherein said geodetically calibrated reference imagery comprises position information with respect to the Earth;

an alignment module for simultaneously aligning a plurality of input images from said sequence of input images to said reference imagery by performing oriented matching, and an outlier rejection module.

24. A method for performing geo-spatial registration of an input image and geodetically calibrated reference imagery comprising:

producing geodetically calibrated reference imagery relating to imagery in said input image, wherein said geodetically calibrated reference imagery comprises position information with respect to the Earth;

processing the input image and said reference imagery using an oriented filter; and aligning said processed input image and said processed reference imagery by performing oriented matching.

25. The method of claim 24 wherein said input image is an image mosaic.

26. The method of claim 24 further comprising:

correlating said processed input image with said processed reference imagery;

removing inaccurate correlations between said preprocessed input image and said preprocessed reference image.

27. A method for performing geo-spatial registration of a sequence of input images and geodetically calibrated reference imagery comprising:

producing geodetically calibrated reference imagery relating to imagery in said input images, wherein said geodetically calibrated reference imagery comprises position information with respect to the Earth; and simultaneously aligning a plurality of input images from said sequence of input images to said reference imagery by performing oriented matching.

* * * * *

UNITED STATES PATENT AND TRADEMARK OFFICE
CERTIFICATE OF CORRECTION

PATENT NO. : 6,597,818 B2
DATED : July 22, 2003
INVENTOR(S) : Kumar et al.

It is certified that error appears in the above-identified patent and that said Letters Patent is hereby corrected as shown below:

Column 1,
Line 14, please change "DMB07" to -- DAAB --.
Line 59, please change "their geo-coordinates seen" to -- their geo-coordinates needs to be solved in order to ascertain the geo-locations of objects seen --.

Column 14,
Line 42, Equation (7) please change "$+k(X_r,Y_r)$" with -- $*k(X_r,Y_r)$ --

Column 17,
Line 41, after the first coordinate, please add -- $p_{r_j} = (\mu_j, \nu_j)_r = (x_j/w_j, y_j/w_j)_r^T$ --

Column 25,
Line 8, please delete the second occurrence of "an input image"

Signed and Sealed this

Ninth Day of December, 2003

JAMES E. ROGAN
*Director of the United States Patent and Trademark Office*